United States Patent

[11] 3,567,919

| [72] | Inventor | Jacques Alphen<br>La Celle Saint-Cloud, France |
|---|---|---|
| [21] | Appl. No. | 736,103 |
| [22] | Filed | June 11, 1968 |
| [45] | Patented | Mar. 2, 1971 |
| [73] | Assignee | Societe dite: Projecteurs Cibie |
| [32] | Priority | June 13, 1967, Apr. 19, 1968 |
| [33] | | France |
| [31] | | 110111 and 148692 |

[54] SWIVELLING HEADLAMPS FOR SELF-PROPELLED VEHICLES
7 Claims, 3 Drawing Figs.

[52] U.S. Cl. .................................................. 240/8.25
[51] Int. Cl. .................................................. B60q 1/12
[50] Field of Search .................................... 240/7.35,
8.25, 41.6, 44, 44.1, 7.1, 41.2, 41.3, 41.4,

[56] References Cited
UNITED STATES PATENTS
1,468,784  9/1923  Hughes...................... 240/8.25

| 1,948,264 | 2/1934 | Hoag.............. | 240/8.25 |
| 2,142,457 | 1/1939 | Robbins .......... | 240/8.25 |
| 2,269,554 | 1/1942 | Rolph.............. | 240/7.35 |
| 2,587,807 | 3/1952 | Arenberg ........ | 240/7.35 |
| 2,962,581 | 11/1960 | Kurose ............ | 240/8.25 |
| 3,415,983 | 12/1968 | McGee............. | 240/8.25 |

*Primary Examiner*—Samuel S. Matthews
*Assistant Examiner*—Russell E. Adams, Jr.
*Attorney*—Breitenfeld and Levine ABSTRACT: Swivelling headlamp includes reflector pivotable about a vertical axis and adapted to swing in response to turning of a vehicle's front wheels. A stationary lens having a substantially smooth central portion causing little light dispersion, and fluted lateral areas serving to spread the beam width and reduce its height is fixed to the coachwork of the vehicle in front of the pivotable reflector. The pivotable reflector may be carried adjacent to stationary reflectors of other lamps.

INVENTOR:
JACQUES ALPHEN
ATTORNEYS

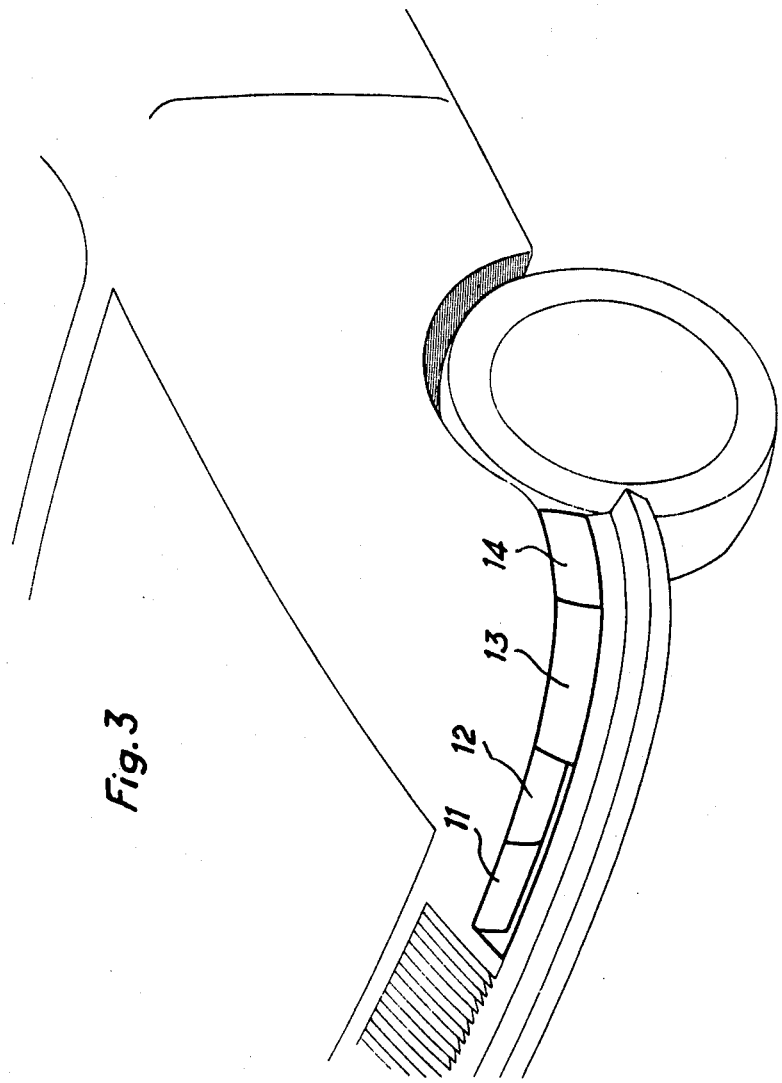

SWIVELLING HEADLAMPS FOR SELF-PROPELLED VEHICLES

The present invention relates to swiveling headlamps for self-propelled vehicles.

Suggestions were already made a long time ago, to equip motor cars with headlamps whose beam, and meaning the "main" beam in particular, can accompany the displacement on the front wheels of the vehicle on bends, by connecting the steering mechanism of the vehicle to the headlamp or at least to its optical system and to its reflector in particular by means of an appropriate transmission line.

Although relatively rare in view of the comparatively high cost of the said transmission line, a swiveling headlamp of this nature is fully satisfactory by providing optimum coincidence between the turning radius of the vehicle and the angle through which its light beam may be swiveled with respect to the axis of the vehicle.

Regarding the actual illumination obtained on bends however, this solution is much less than wholly satisfactory. When the vehicle travels in a straight line on a road, the headlamp beams must necessarily be long-range beams lighting the center of the road over a considerable distance and lighting the verges evenly over a shorter distance. When such beams are swiveled in concert with the front wheels of the vehicle, the inside of the bend is then illuminated in the same way as the central part of the road had been illuminated during straight-line travel, that is to say in a very unsatisfactory manner, since the headlamp should extensively illuminate an area situated at a short distance from the vehicle for optimum visibility of the inside of the bend.

The present invention has as its object to obviate this essential disadvantage of conventional swiveling headlamps and, to this end, relates to a lighting aggregate for self-propelled vehicles in which, in a manner known per se, a reflector organized for illumination on bends and coordinated with a source of light, is arranged to swivel about a substantially vertical axis in a motion linked with that of the front wheels of the vehicle, the said reflector operating in conjunction with a stationary lens, the latter in its central portion possessing a practically smooth area causing very little dispersion only of the light beam, and on its lateral parts towards the right and the left possessing increasingly dispersive areas, in such manner that a change in orientation of the reflector causes the spreading in width and the contraction in height of the beam in proportion to the angle of rotation that is to say with the curve of the bend.

The invention will now be described with reference to the accompanying drawings, which illustrate the invention, but in no restrictive sense.

FIG. 3 illustrates a lighting and direction indicator aggregate incorporating a cornering headlamp according to the invention.

Figure 2:
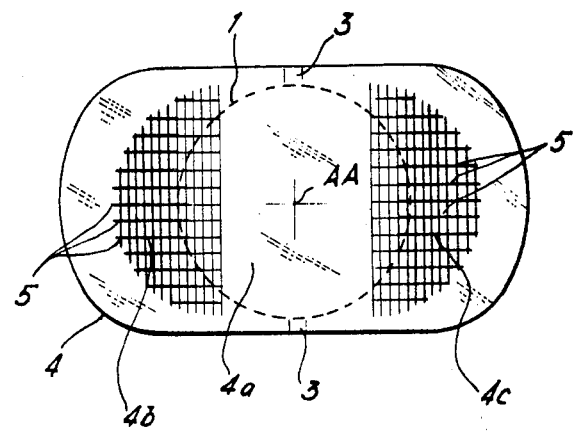
FIG. 2 illustrates a frontal view of the lens of a headlamp of this nature.
Figure 1:
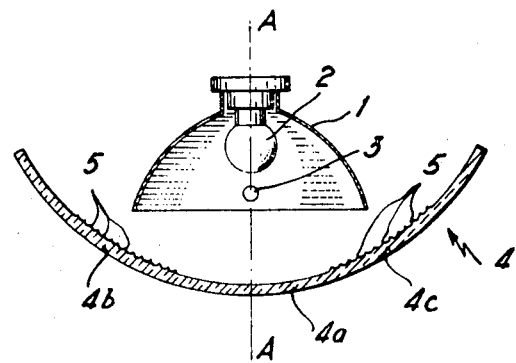
FIG. 1 illustrates a vertical axial section of a headlamp or lighting aggregate according to the invention.

As apparent from FIGS. 1 and 2, the headlamp according to the invention comprises a reflector 1, a bulb 2, the assembly of these elements being organized to swivel around a vertical axis journaled in two bearings 3, the said swiveling action being mechanically linked in any known manner to the orientation of the front wheels of the vehicle.

This assembly is coordinated with a stationary lens 4, whereof the axis of symmetry AA coincides with the axis of the reflector 1 in the median position, that is to say with the overall axis of the vehicle. The size and layout of the lens 4 are such that, for any orientation of the assembly 1 and 2, it is traversed by the entire beam reflected by the reflector 1.

In characteristic manner, the central part of the lens at either side of the axis AA is smooth or very lightly fluted, so that it causes very little dispersion only. This part $4a$ is thus identical to the lens of a fixed headlamp possessing a bulb 2 and a reflector 1, as a source of light. When the vehicle travels in a straight line, the illumination of the road obtained amounts to conventional lighting, therefore. By contrast, the areas $4b$ and $4c$ of the lens, laterally offset from the axis, and which are not normally traversed by the light when the vehicle travels in a straight line, are arranged in such manner as to cause dispersion of the light. This effect increases in intensity as the beam is deflected from the axis AA, that is to say towards the left or towards the right. For this purpose, the said areas bear a grid of flutes or the like 5, in which the spacing becomes ever shorter as the beam progresses away from the axis.

In the example illustrated in FIGS. 1 and 2, and as clearly apparent from FIG. 2, the grid is a double network of vertical and horizontal flutes or the like, wrought on the inner side of the lens.

When the axis of the reflector 1 is deflected to the left or right of the axis AA in executing a turn, the light beam issuing from the headlamp is caused by the arrangement of the flutes to spread in width and contact in height. Since the spacing of the flutes decrease with increased distance from the lens axis, the dispersive effect increases as the amount of deflection of the reflector increases. As a result, the inside shoulder of the bend of the road is assured optimum illumination.

A swiveling headlamp or so-called cornering headlamp, has been described with reference to FIGS. 1 and 2.

The present invention equally relates to a lighting and direction indicator aggregate intended to be positioned at the front of a self-propelled vehicle, this aggregate incorporating a turning mechanism coordinated with a swiveling beam of the type hereinbefore cited.

In more specific manner, the present invention relates to a lighting and direction indicator aggregate which comprises an optical system consisting of a long-range headlamp, another optical system forming a crossing or dipped headlamp, and yet another optical system forming a so-called cornering headlamp.

This aggregate preferably also incorporates a lamp acting as a sidelamp as well as a direction indicator lamp.

The optical system forming a cornering headlamp and the said dual function lamp i.e., the lamp acting as both a sidelamp and as a direction indicator, operate in conjunction with one and the same fluted lens fixed to with the coachwork of the vehicle.

The aggregate illustrated in FIG. 3, positioned at the front of a vehicle, comprises a system 11 forming a long-range headlamp, a system forming a crossing or dipped headlamp 12, a system forming a cornering headlamp 13, and a combined sidelamp and direction indicator section 14.

The reflectors of the elements 11 and 12 are each assembled with a lens to form a conventional optical unit.

The reflector of the element 13 is directionally displaceable, and operates in conjunction with a stationary lens connected to the coachwork of the vehicle, in the manner described with reference to FIGS. 1 and 2.

The element 13 and the lamp 14 advantageously operate in conjunction with a single lens 10.

I claim:

1. A swiveling headlamp for a self-propelled vehicle having a front wheel, comprising at least one reflector arranged to pivot about a substantially vertical axis, the direction and amount of pivotal movement of said reflector corresponding to the direction and amount of pivotal movement of the vehicle front wheel, a source of light within said reflector, a lens stationary with respect to the vehicle located in front of said reflector, the central area of said lens being formed to cause little or no dispersion of the light beam from said reflector, and means located in the path of light passing through the lateral portions of said lens for dispersing the light beam in a manner which increases the width and decreases the height of the beam, said means being so formed that said dispersion of the light beam increases with increase in distance of the light beam from the center of said lens resulting from pivotal movement of said reflector.

2. A swiveling headlamp as defined in claim 1 wherein said dispersion means is carried by said lens.

3. A swiveling headlamp as defined in claim 2 wherein said dispersion means includes flutes formed in said lens.

4. A swiveling headlamp as defined in claim 3, wherein the spacing between adjacent flutes decreases with increase in distance of said flutes from the center of said lens.

5. A swiveling headlamp as defined in claim 3, wherein said flutes extend in mutually perpendicular directions to form a grid of flutes.

6. A swiveling headlamp as defined in claim 5, wherein the spacing between adjacent flutes extending in the same direction decreases with increase in distance of said flutes from the center of said lens.

7. A swiveling headlamp as defined in claim 1 and a light source stationary with respect to the vehicle adjacent to said swiveling headlamp.